(12) United States Patent  (10) Patent No.: US 8,483,610 B2
Lortz  (45) Date of Patent: *Jul. 9, 2013

(54) SERVICE PROVISIONING UTILIZING NEAR FIELD COMMUNICATION

(75) Inventor: Victor Lortz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/194,289

(22) Filed: Jul. 29, 2011

(65) Prior Publication Data

US 2011/0287716 A1 Nov. 24, 2011

Related U.S. Application Data

(62) Division of application No. 11/968,063, filed on Dec. 31, 2007, now Pat. No. 8,014,720.

(51) Int. Cl.
*H04B 5/00* (2006.01)

(52) U.S. Cl.
USPC .................. 455/41.1; 455/41.2; 455/41.3

(58) Field of Classification Search
USPC ....................... 455/41.1–41.3, 461
See application file for complete search history.

(56) References Cited

U.S. PATENT DOCUMENTS

| | | | |
|---|---|---|---|
| 7,881,709 B2* | 2/2011 | Wakasa et al. | 455/418 |
| 8,024,815 B2* | 9/2011 | Lorch et al. | 726/29 |
| 2007/0190939 A1 | 8/2007 | Abel | |
| 2008/0090595 A1 | 4/2008 | Liu et al. | |
| 2011/0111777 A1 | 5/2011 | Wakasa et al. | |

FOREIGN PATENT DOCUMENTS

| | | |
|---|---|---|
| CN | 1955974 A | 5/2007 |
| EP | 1760991 | 3/2007 |
| JP | 2004-530958 | 10/2004 |
| JP | 2005-510802 | 4/2005 |
| JP | 2006-505178 | 2/2006 |
| JP | 2009-540679 | 11/2009 |
| WO | 0244892 | 6/2002 |
| WO | 03046742 | 5/2003 |
| WO | 2004040793 | 5/2004 |
| WO | 2007149338 | 12/2007 |

OTHER PUBLICATIONS

Office Action for CN 200810188974.1, mailed Feb. 16, 2012, 15 pages.
Notice of Reasons for Rejection, issued in Japanese Patent Application No. 2008-317532, mailed Jun. 14, 2011, 2 pages.
Office Action, issued in U.S. Appl. No. 11/968,063, mailed Nov. 4, 2010, 6 pages.
Office Action, issued in U.S. Appl. No. 11/968,063, mailed Dec. 2, 2010, 7 pages.
Notice of Allowance, issued in U.S. Appl. No. 11/968,063, mailed May 5, 2011, 8 pages.
European Search Report, issued in EP Patent Application No. 08254103.8, mailed Dec. 16, 2011, 5 pages.

(Continued)

*Primary Examiner* — Tuan H Nguyen
(74) *Attorney, Agent, or Firm* — Schwabe, Williamson & Wyatt, P.C.

(57) ABSTRACT

Embodiments of the present invention provide methods, apparatuses, and programming instructions configured to enable a device to receive provisioning data over a Near Field Communication link, and utilize the provisioning data to receive services.

13 Claims, 4 Drawing Sheets

OTHER PUBLICATIONS

Decision to Grant, issued in Japanese Patent Application No. 2008-317532, mailed Nov. 15, 2011, 1 page.

Office Action mailed Aug. 27, 2012, for Chinese Patent Application No. 200810188974.1, 27 pages.

* cited by examiner

SERVICE PROVISIONING UTILIZING NEAR FIELD COMMUNICATION

CROSS-REFERENCE TO RELATED APPLICATION

The present application is a divisional that claims the benefit under 35 U.S.C. §120 to U.S. patent application Ser. No. 11/968,063, entitled "SERVICE PROVISIONING UTILIZING NEAR FIELD COMMUNICATION," filed Dec. 31, 2007, assigned to the same assignee as the present application, and which is incorporated herein by reference in its entirety.

TECHNICAL FIELD

Embodiments of the present invention relate to fields of data processing and data communications, and, more specifically, to utilizing Near Field Communications to provision applications and/or services for a device.

BACKGROUND

The popularity of Near Field Communication ("NFC") technology is steadily increasing in the electronics industry. This popularity is being driven by the simple, secure, and intuitive nature of NFC devices. NFC is a short-range wireless connectivity technology that may provide digital communication between devices by touching them together or placing them within a close proximity to each other (e.g., approximately two inches). This intuitive technology may be incorporated into stand-alone, discrete devices, or on the other hand may be incorporated into existing devices, which may be referred to as NFC communications enabled devices.

Near field communication typically requires an antenna or transceiver of one NFC device to be within a magnetic field generated by another NFC device. The NFC device may then inductively couple to the magnetic field and form a communication link. Typically, the magnetic field may be generated by the transmission of a radio frequency ("RF") signal, for example a 13.56 MHz signal, which may be modulated to enable communication between the various NFC devices. Each NFC device may be capable of both responding to and generating an NFC communication link.

The primary applications currently driving deployment of NFC in the industry are multi-factor authentication, event ticketing, mass transit ticketing, and payment systems.

In the field of data processing, services are typically provisioned to user devices via shrink-wrapped software, downloadable software, or website registration over the internet. These services may require navigation to a website and registration of a password, user information, and possibly a credit card number for payment, thereby providing a security threat to the user. While shrink-wrapped services may not require use of a network, shrink-wrapped software is expensive to produce and distribute compared to downloadable software.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

DETAILED DESCRIPTION OF EMBODIMENTS OF THE INVENTION

Figure 1:
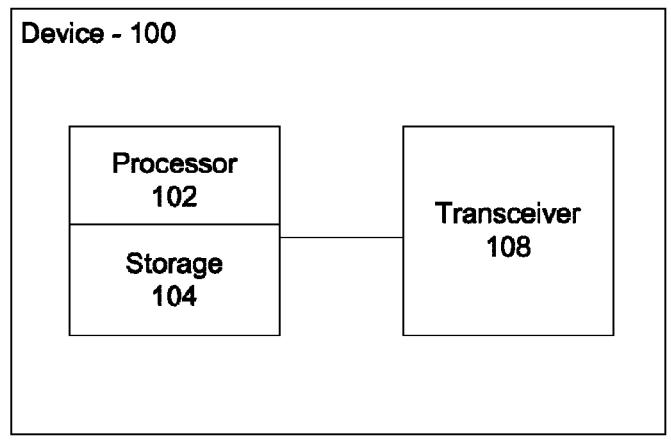
FIG. 1 illustrates a block diagram of an exemplary NFC device in accordance with various embodiments of the present invention.

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent. Additionally, the description of multiple discrete operations should not be construed to mean each and every operation is required to practice the invention.

The description may use perspective-based descriptions such as up/down, back/front, and top/bottom. Such descriptions are merely used to facilitate the discussion and are not intended to restrict the application of embodiments of the present invention.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

In various embodiments of the present invention, methods, apparatuses, and systems for provisioning services on an NFC communications enabled device are provided. In exemplary embodiments of the present invention, a computing system may be endowed with one or more components of the disclosed apparatuses and/or systems and may be employed to perform one or more methods as disclosed herein.

Embodiments of the present invention provide a secure, intuitive, and simple manner of provisioning software, applications, and services on Near Field Communication ("NFC") devices. In various embodiments, a NFC device may be supplied with provisioning data including secure application bootstrapping information associated with a service. The NFC device may transmit the provisioning data through a NFC communication link to a NFC communications enabled device. The NFC communications enabled device may receive the provisioning data, and upon receipt, may utilize the provisioning data to request and ultimately receive the service. In various embodiments, the request may be transmitted directly to a service provider, or in other embodiments, the request may transmitted to a trusted intermediary. In various embodiments, the services may include downloadable software or software modules, registration of services including internet access (e.g., Wi-MAX, Wi-Fi hotspots), Voice over Internet Protocol ("VoIP") service, or receipt of configuration parameters associated with the various services.

Referring to FIG. 1, a Near Field Communication ("NFC") device 100 is illustrated. In various embodiments, a NFC device 100 may comprise a processor 102 and a storage block 104 coupled to a transceiver 108. In various embodiments, the processor and storage may be integrated onto a signal integrated circuit chip in a signal package, and in others they may be separately disposed. The invention is not to be limited in this regard. The storage block 104 may store provisioning data configured to enable a device provisioned with the data to receive a service. The transceiver 108 may be a NFC transceiver and may transmit the provisioning data, from the storage block 104, responsive to a magnetic field. In alternate embodiments, transceiver 108 may be implemented as a transmitter and a receiver. For the purpose of this application, including the claims, the term transceiver shall mean both combined as well as separate implementations of a transmitter and a receiver. Additionally, the NFC device 100 may also include other components such as, but not limited to, transponders, coupling devices, power deriving circuits, and modulators (not illustrated) to further enable the NFC device 100 to communicate over a NFC link.

In various embodiments, storage block 104 may comprise volatile or non-volatile memory to store provisioning data, the invention is not to be limited in this regard. The provisioning data may include at least one of a unique user identity (e.g., a card or an account identity), an application identity (e.g., a human readable application or service icon), an installation uniform resource locator ("URL"), or security information (e.g., confirmation hashes, and/or digital signatures computed over the other provisioning data or over the data referred to by the URL). The provisioning data may be provided to the NFC device 100 at the time of manufacture of the device, or at a later time, for example via a connection with a network such as the internet.

In various embodiments, the provisioning data includes application bootstrapping information associated with a service. More specifically, the provisioning data may be configured to enable a device provisioned with the data to receive and install a software module on the device. In the embodiment, the software module may be received from a secure source indicated by the provisioning data and may be received via a network, such as the internet. As an example, the provisioning data may include at least an application installation URL of a secure source. The provisioning data may enable a device to navigate to a specific URL, download, verify integrity, and install the software module via a network (e.g., the internet). In this manner, a user may be protected from navigating to illegitimate sources and downloading harmful software. Additionally, the secure source may provide the NFC device 100 directly to a user, for example at a point-of-sale purchase. This may effectively negate the need for the transmission of personal identification data such as names, passwords, and account information over a network. These embodiments may be discussed in more detail with reference to FIG. 2.

In other embodiments, the provisioning data may enable the device provisioned with the data to receive a service such as, but not limited to, internet access, voice over internet protocol ("VoIP") service, or downloadable software. These services may also be directly associated with the provisioning data. In other embodiments, the provisioning data may be configured to enable the device to receive configuration parameters associated with the various services.

In another embodiment, the provisioning data may be configured to enable a device to receive a software module from a secure source, wherein the secure source is a trusted intermediary. For example, the provisioning data may enable a device to request a software module from a secure source via a secure connection. In response to the request for the software module, the secure source may retrieve the software module from a provider. In this manner, the secure source may verify the validity of the software module prior to transmitting the software module to the device. This will be described further with reference to FIG. 3.

In various embodiments, NFC device 100 may be a discrete device, for example a physical card, containing software and provisioning data. The software and provisioning data may be stored in the discrete device at the time of manufacture or at a later time. In other embodiments, NFC device 100 may be an NFC reader incorporated into an NFC communications enabled device, for example, a mobile device. The NFC reader may be capable of emulating a discrete device. In this manner, a mobile device (e.g., mobile phone) may be used in virtually the same manner as a discrete NFC device. In this embodiment, an NFC reader incorporated into a mobile device such as a mobile phone may further utilize the communications capabilities of the mobile device (e.g., wireless communications). For example, the mobile device may update and load the NFC reader with provisioning data via over-the-air transactions. As a result, the provisioning data may be dynamically provided, and the NFC reader may function in the same manner as a discrete NFC device.

Figure 2:
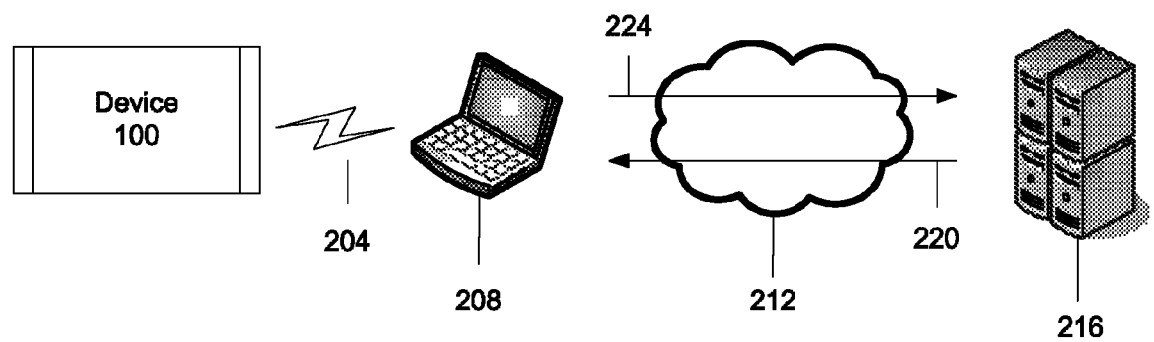
FIG. 2 illustrates a system diagram in accordance with various embodiments of the present invention.

Referring to FIG. 2, a diagram for use to practice various embodiments of the present invention is illustrated. FIG. 2 illustrates a NFC device 100 in communication with a NFC communications enabled device 208 via a NFC communication link 204. Additionally, the NFC communications enabled device 208 may be coupled to a secure source 216 (such as a secure network server) via a network 212. The NFC communications enabled device 208 may communicate with the secure source 216 via communications 224 and 220.

In various embodiments, NFC device 100 may be a device as described above with reference to FIG. 1. More specifically, NFC device 100 may be a discrete NFC device endowed with provisioning data (e.g., a NFC card), or NFC device 100 may be a NFC communications enabled device configured to emulate a discrete NFC device (e.g., a NFC card).

NFC communications enabled device 208 may be a device capable of communication over a NFC communication link 204 in addition to a separate network 212 such as, but not limited to, the internet. NFC communications enabled device 208 may be one of many devices known in the art such as, but not limited to, a personal computer, mobile internet device, cell phone, gaming devices, etc. The NFC communications enabled device 208 may include provisioning software in the form of a plurality of programming instructions stored on a computer readable medium. A computer readable medium may include any mechanism that provides (i.e. stores and/or transmits) information in a form readable by a computer. For example, a computer readable medium may include read only memory, random access memory, magnetic disk storage media, optical storage media, or flash memory devices. Additionally, the computer readable medium may provide electrical, optical, acoustical or other forms of propagated signals (e.g. carrier waves, infrared signals, digital signals). The invention is not to be limited in this regard.

In various embodiments, the plurality of programming instructions may be written in a computer programming language or may be embodied in firmware logic, reconfigurable logic, a hardware description language, a state machine, an application-specific integrated circuit, or combinations thereof. If written in a programming language conforming to a recognized standard, such instructions may be executed on a variety of hardware platforms and may interface with a variety of operating systems. The invention is not to be limited in this regard.

In various embodiments, the programming instructions may be designed to enable the NFC communications enabled device 208 to control a radio frequency field generator to create a near radio frequency ("RF") field around the NFC communications enabled device 208. Alternatively or additionally, the programming instructions may be designed to enable the NFC communications enabled device 208 to respond to a near RF field generated and controlled by a separate NFC device.

In various embodiments, the programming instructions may be further designed to enable the NFC communications enabled device 208 to detect and receive provisioning data including a unique user identity, an account identity, an application identity, an installation URL, or security information as previously described. The provisioning data may be provided by a NFC device 100 responsive to the radio frequency field. For example, the NFC communications enabled device 208 may create and control a near radio frequency field. A NFC device 100 may then respond to the near RF field by inductively coupling to the field. Once inductively coupled, the NFC device 100 may modulate and transmit data to the NFC communications enabled device 208. The NFC communications enabled device 208 may detect the data, and thereafter, utilize programming instructions to receive, and demodulate the data (e.g., provisioning data).

In various embodiments, the provisioning data may be received by the NFC communications enabled device 208 via NFC communications link 204. NFC communications link 204 may be generated by the NFC communications enabled device 208 through the transmission of an RF signal. In other embodiments, the NFC device 100 may generate the NFC communications link 204 through transmission of an RF signal. NFC device 100 and NFC communications enabled device 208 may each include transponders, tags, and/or transceivers that are capable of initiating and responding to the NFC communications link. In various embodiments, the NFC communications link may be an RF transmission at 13.56 MHz, and may have a range of up to approximately two inches. In other embodiments, RF transmissions may be of various frequencies and have greater or lesser transmission ranges. In this manner, NFC communications link 204 may enable NFC device 100 and NFC communications enabled device 208 to transfer digital data.

In other embodiments, upon detecting and receiving the provisioning data, the plurality of programming instructions may enable the NFC communications enabled device 208 to request 224 from a source 216 via a network 212, a service associated with the provisioning data. In various embodiments, the request 224 may be over a secure communication with the source 216, and the source may be a secure source. Such a secure communication may be a secure tunnel (e.g., SSL) setup between the NFC communications enabled device 208 and the source 216. In other embodiments, the request may be instigated manually through the use of various peripheral devices such as, for example, a keyboard, a mouse, or a joystick. Alternatively, the request may be instigated automatically in response to the receipt of the provisioning data. In response to the request, the device may receive application installation data associated with a requested service.

In various embodiments, once the NFC communications enabled device 208 has received the application installation data, the NFC communications enabled device 208 may verify the validity of the received data by performing a validity verification. Validity verification may include, but is not limited to, verifying data integrity, performing virus scans, scanning for malware, comparing security hashes, and verifying sources and digital signatures. In other embodiments, the provisioning software may enable the installation of the received data in an isolated partition. The isolated partition may be isolated from a main partition which may include operating systems, firmware, and other necessary programs.

In various embodiments, the network 212 may be the internet, or in other embodiments may be a network of privately coupled computers, the invention is not to be limited in this regard.

In various embodiments, a secure source 216 may be a service provider situated on the internet or on another network of coupled computers. The secure source 216 may be operated by known providers capable of authenticating themselves to the NFC communications enabled device, or unknown providers. Secure source 216 may provide services including internet access, for example Wi-MAX access or Wi-Fi hotspot access, downloadable software or software modules, Voice over Internet Protocol ("VoIP") service, digital photo processing, online club membership, and product purchase rebates, etc. The invention is not to be limited in this regard. In various embodiments, these services may require installation of software or the configuration of parameters on the host device prior to access.

In various embodiments, the NFC communications enabled device 208 may request services from a service provider 216 via communication 224 over a network 212, and may receive the service and/or service application installation data via communication 220 over network 212. In various embodiments, the service application installation data may facilitate the configuration or installation of parameters or software to enable the device to receive a service.

Figure 3:
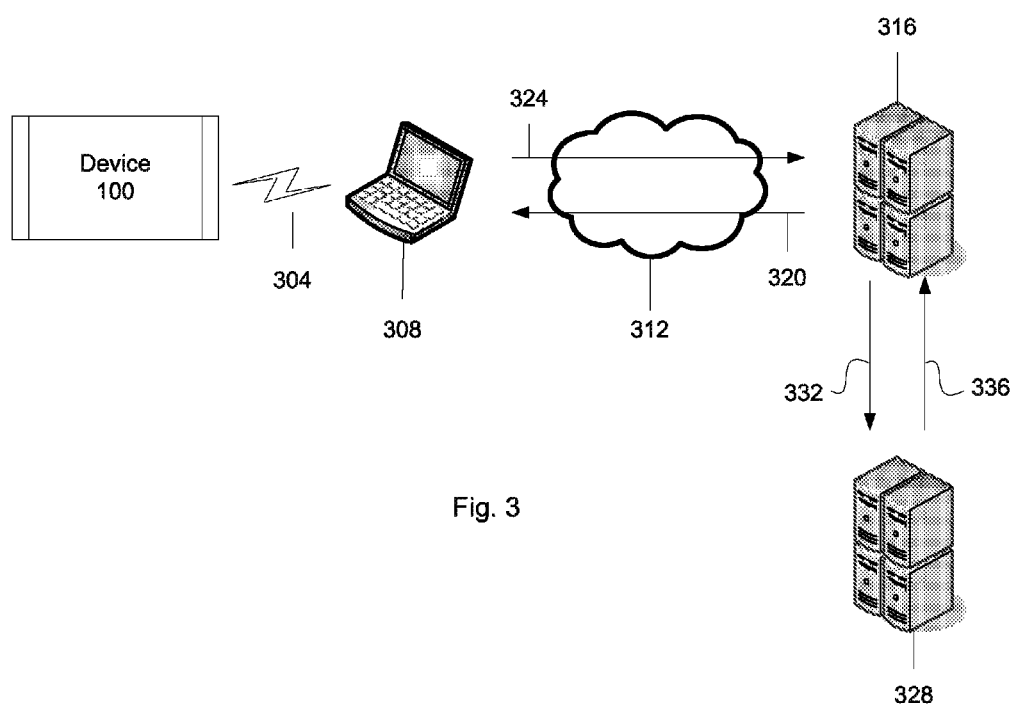
FIG. 3 illustrates a system diagram in accordance with various embodiments of the present invention.

Referring to FIG. 3, a diagram for use to practice the invention is provided in accordance with various embodiments. FIG. 3 includes all the elements of FIG. 2 with the addition of a trusted intermediary acting as a secure source 316. In various embodiments, NFC communications enabled device 308 may request data from a source based upon provisioning data provided by NFC device 100. The provisioning data may have been provided from the service provider 328 from which the requested service is to be received. Service provider 328 may be a server situated on the internet for the purpose of providing downloadable software or services to device 308 via a network connection such as the internet. NFC communications enabled device 308 may request services from the service provider 328 via a secure source 316. The request may be transmitted via a network connection in which the NFC communications enabled device 308 has already established a secure communication such as a secure tunnel (e.g., SSL) with the secure source 316 (e.g., the trusted intermediary). In this embodiment, the secure source 316 may perform a validity verification of the requested data received from the service provider 328. The validity verification may include verifying data integrity, performing virus scans, scanning for malware, comparing security hashes, and verifying sources and digital signatures. In other embodiments, keys may be used to establish trust in a trusted intermediary.

As an example, a NFC device 100 may communicate with an NFC communications enabled device 308 via a NFC communication link 304. The NFC device 100 may transmit provisioning data associated with a service to the NFC communications enabled device 308. The NFC communications enabled device 308, with provisioning software, may read the data, and seek confirmation that a user wishes to receive the requested data. The NFC communications enabled device 308 may then request 324 services associated with the provisioning data from a secure source 316. In response, secure source 316 may request 332 the services desired by the NFC communications enabled device 308 from a service provider 328. The service provider 328 may provide 336 the requested data or service application installation data to the secure source 316. In this manner, the secure source 316 may verify the validity of the requested data prior to transmitting the requested data to the NFC communications enabled device 308. Upon a successful verification, the secure source may transmit 320 the requested data to the NFC communications enabled device 308. In various embodiments, the secure source 316 may communicate 332, 336 with the service provider 328 via a network such as the internet. Thereafter, the NFC communications enabled device 308 may install, configure, or utilize the requested service.

Figure 4:
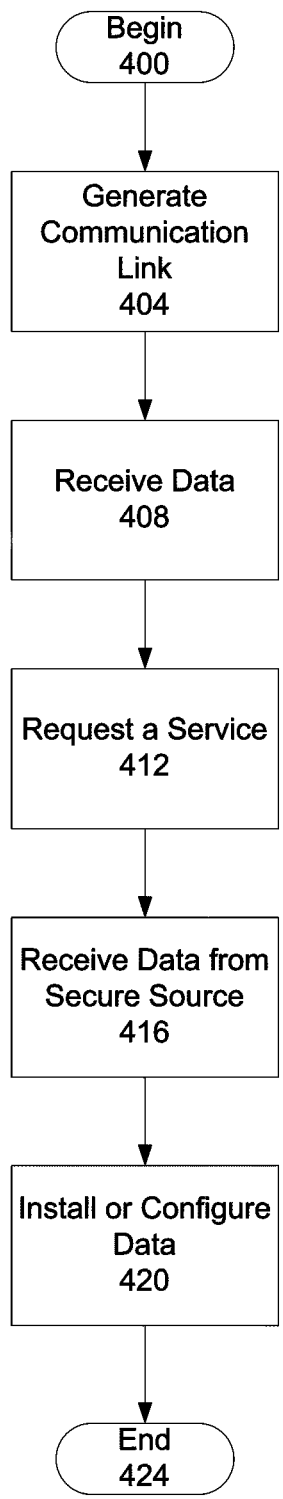
FIG. 4 illustrates a flow diagram suitable for use to practice a method in accordance with various embodiments.

Referring to FIG. 4, a flow diagram suitable for use to practice a method, in accordance with various embodiments is illustrated. The method may begin at block 400 and progress to block 404 where an NFC enabled communication device may generate a communication link. In various embodiments, the communication link may be generated by the transmission of a radio frequency ("RF") signal which generates a magnetic field. A NFC device may inductively couple with the magnetic field and modulate a signal to be transmitted, the signal containing provisioning data.

At block 408, the NFC communications enabled device may receive data. In various embodiments, the data may be provisioning data including a unique user identity, an account identity, an application identity, an installation uniform resource locator, security information, human readable application or service name icons, etc. In various embodiments, the provisioning data may be directly associated with a service to be requested by the NFC communications enabled device. Additionally, the data may be detected, received, and processed by provisioning software installed on the NFC communications enabled device.

In various embodiments, the NFC communications enabled device may request a service associated with provisioning data at block 412. The request may be processed by provisioning software installed on the NFC communications enabled device, and may be transmitted via a network connection, such as the internet, to a known or unknown service provider. In various embodiments, a known or unknown service provider may be a secure source. Alternatively, a trusted intermediary may be a secure source that receives a service from a known or unknown service provider prior to transmission to the NFC communications enabled device. In various embodiments, a secure source may perform a validity verification on the requested data.

The NFC communications enabled device may then receive from the secure source (e.g., a service provider or a trusted intermediary) the requested data at block 416. In various embodiments, the requested data may be related to a service such as internet access (e.g. Wi-MAX or Wi-Fi hotspot access), VoIP service, or downloadable software or software modules.

Once the requested data has been received, the device may install, configure, or utilize the received data or service at block 420. In various embodiments, provisioning software on the NFC communications enabled device may perform a validity verification on the received data. This may be in addition to a secure source performing a validity verification. In other embodiments, the provisioning software may install or configure the data in an isolated partition. The isolation partition being isolated from a main partition wherein a majority of the necessary firmware, software, and OS to operate the NFC communications enabled device are installed. After the received data or services have been installed on the NFC communications enabled device, the method may proceed to block 424 and end.

Figure 5:
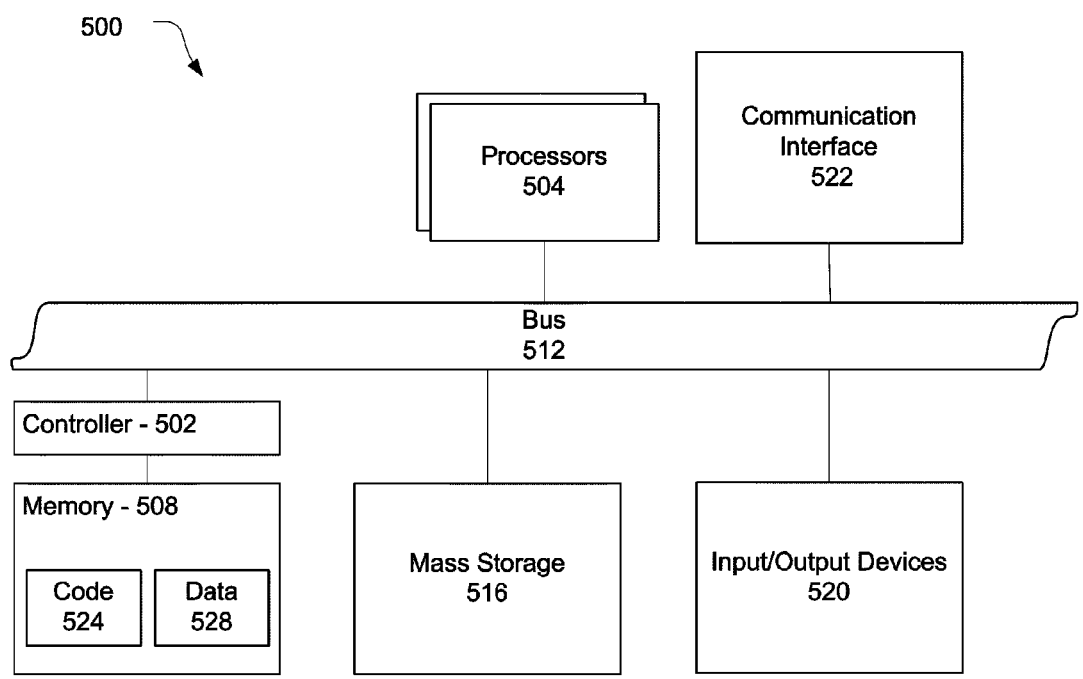
FIG. 5 illustrates a computing system suitable for use to practice the invention, in accordance with various embodiments.

Referring now to FIG. 5, a computing system suitable for use to practice the invention is illustrated in accordance with various embodiments. FIG. 5 illustrates an example computing system/device suitable for use to practice the various embodiments of the present invention. As shown, computing system/device 500 may include one or more processors 504, and system memory 508. Additionally, computing system/device 500 may include mass storage devices 516 (such as diskette, hard drive, CDROM and so forth), input/output devices 520 (such as keyboards, joysticks, and a mouse), and communication interfaces 522 (such as network interface cards, modems, antennas, transceivers, transponders, NFC devices and so forth). The elements may be coupled to each other via system bus 512, which represents one or more buses. In the case of multiple buses, they may be bridged by one or more bus bridges (not shown). Finally, controller 502 may be provided and configured to operate memory 508. In embodiments, some or all of the functions of controller 502 could be effectively implemented within memory 508. Each of the elements of computer system/device 500 may perform its conventional functions known in the art. In particular, system memory 508 and mass storage 516 may be employed to store a working copy and a permanent copy of programming instructions implementing in part or in full, the functionality described above for a NFC communications enabled device, a secure source or a trusted intermediary.

Although FIG. 5 depicts a computer system, one of ordinary skill in the art will recognize that embodiments of the present disclosure may be practiced using other devices such as, but not limited to, mobile telephones, Personal Data Assistants (PDAs), gaming devices, appliances, networking devices, digital music players, digital media players, laptop computers, portable electronic devices, as well as other devices known in the art.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An article of manufacture comprising:
    a non-transitory computer readable medium;
    a plurality of programming instructions stored on the computer readable medium and executable by a processor to enable an electronic device to:
        create a near radio frequency field around the electronic device,
        detect and receive provisioning data provided by a near field communication device, via a first communication link, responsive to the radio frequency field; and
        request, from a secure source, via a second communication link coupling the electronic device and the secure source, a service associated with the provisioning data
        wherein the second communication link is different from the first communication link.

2. The article of manufacture of claim 1, wherein the programming instructions are further executable by the processor to enable the electronic device to:
    receive, in response to the request, application installation data associated with the requested service.

3. The article of manufacture of claim 2, wherein the programming instructions are further executable by the processor to enable the electronic device to:
    perform a validity verification of the application installation data.

4. The article of manufacture of claim 2, wherein the programming instructions are further executable by the processor to enable the electronic device to execute the application installation data in an isolated partition of the electronic device.

5. The article of manufacture of claim 2, wherein the programming instructions are further executable by the processor to enable the electronic device to install the application installation data into an isolated partition of the device.

6. The article of manufacture of claim 2, wherein the programming instructions are further executable by the processor to enable the electronic device to receive application installation data associated with at least one of internet access, voice over internet protocol service, or downloadable software.

7. The article of manufacture of claim 1, wherein the programming instructions are executable by the processor to enable the electronic device to receive provisioning data including at least one of a unique user identity, an account identity, an application identity, an installation uniform resource locator, or security information.

8. A method, comprising:
    creating, by an electronic device, a radio frequency field around the electronic device;
    detecting and receiving, by the electronic device, via a first communication link, provisioning data configured to facilitate the electronic device to receive a service associated with the provisioning data, the provisioning data being provided by a near field communication device responsive to the radio frequency field; and
    requesting, by the electronic device from a source, via a second communication link coupling the electronic device and the source, a service associated with the provisioning data,
    wherein the second communication link is different from the first communication link.

9. The method of claim 8, further comprising receiving, by the electronic device in response to the request, application installation data associated with the requested service.

10. The method of claim 9, further comprising performing, by the electronic device, a validity verification of the application installation data.

11. The method of claim 9, further comprising executing or installing, by the electronic device, the application installation data in an isolated partition of the device.

12. The method of claim 9, wherein the application installation data is associated with at least one of internet access, voice over internet protocol service, or downloadable software.

13. The method of claim 8, wherein the provisioning data includes at least one of a unique user identity, an account identity, an application identity, an installation uniform resource locator, or security information.

* * * * *